United States Patent [19]
Lee

[11] 3,980,239
[45] Sept. 14, 1976

[54] FLAIL-TYPE MATERIAL SPREADER

[76] Inventor: John L. Lee, Box 202, Reamstown, Pa. 17567

[22] Filed: Aug. 27, 1975

[21] Appl. No.: 608,313

[52] U.S. Cl. .................................. 239/658; 239/667
[51] Int. Cl.² ............................................ A01C 3/06
[58] Field of Search .................... 239/658, 662, 670; 56/29; 172/45

[56] References Cited
UNITED STATES PATENTS

| | | | |
|---|---|---|---|
| 3,414,199 | 12/1968 | Ferris | 239/658 |
| 3,640,473 | 2/1972 | Webb et al. | 239/658 |

FOREIGN PATENTS OR APPLICATIONS

| | | | |
|---|---|---|---|
| 694,931 | 9/1964 | Canada | 56/29 |
| 846,117 | 8/1960 | United Kingdom | 56/29 |

*Primary Examiner*—Johnny D. Cherry
*Assistant Examiner*—Andres Kashnikow
*Attorney, Agent, or Firm*—Michael R. Swartz; Frank A. Seemar; John R. Flanagan

[57] ABSTRACT

The invention relates to improvements to the starter flails and chain flails of a flail-type material spreader for making these flails more efficient particularly for spreading liquid or semi-liquid material. According to the invention the flails have cupped flail heads, respectively cupped starter elements on the starter flails for more aggressively attacking material reposing in the tank and for more efficiently ejecting said material through the discharge opening. According to another aspect, starter segments have been affixed to the starter impactors at an aggressive angle relative to the elongated axis of said impactors.

13 Claims, 10 Drawing Figures

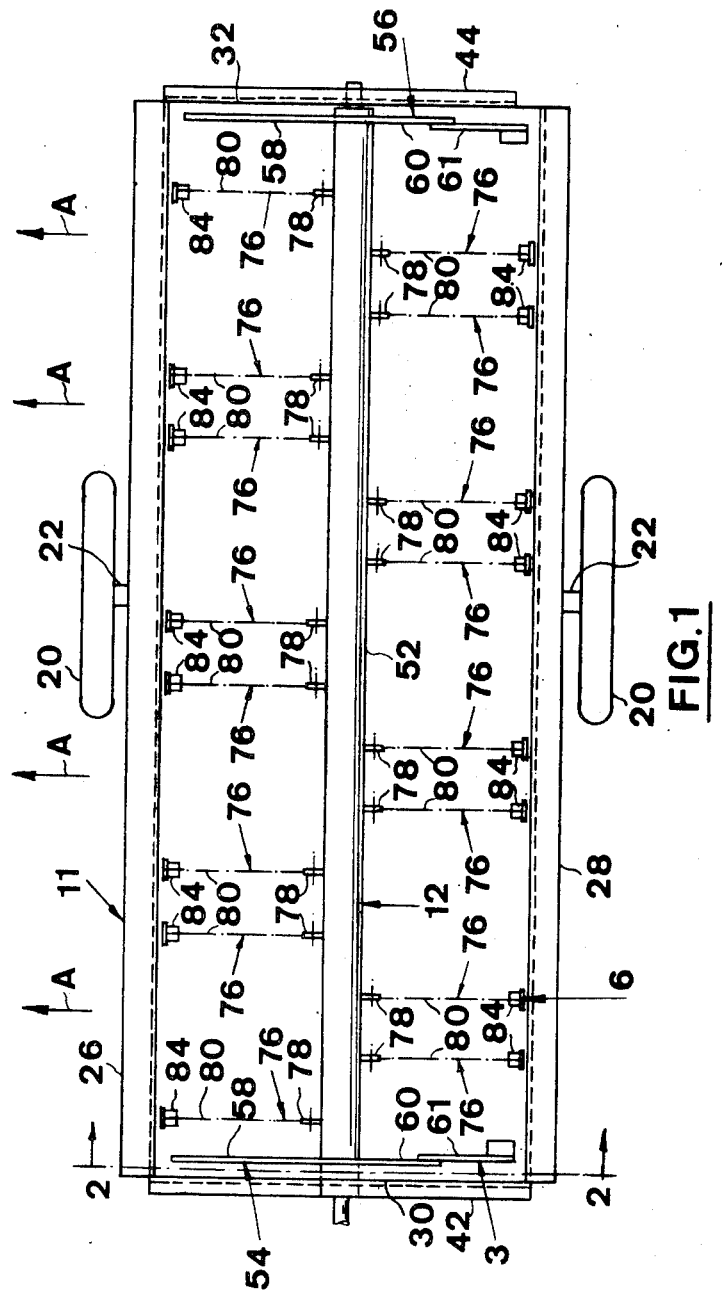

FLAIL-TYPE MATERIAL SPREADER

BACKGROUND OF THE INVENTION

1. Field of the Invention

This invention relates to flail-type material spreaders and is directed particularly to improved flails for such material spreader to improve the spreading operation thereof.

The flail type material spreaders usually have a semicylindrical tank with a longitudinally extending shaft carrying flexible flails for discharging material in the tank. A wide range of material may be handled by the spreader. These materials may be dry manure, sticky manure, sloppy manure, liquid manure, wet manure, frozen manure, and slurry-type manure. Also different types of bedding may be mixed with the foregoing types of manure. The flail-type material spreader satisfactorily handles to some degree all of these various types of material and is therefore very versatile and adaptable to a wide range of conditions on farms.

The tank is mounted on a wheeled frame and usually extends in the direction of travel. The material is discharged by the flails throwing the material through an opening on the side of the spreader. The rotor shaft is connected to the power take off of the tractor through a drive (not shown) on the spreader.

The shaft is driven over a range of speeds depending upon the dishcarging action. The flexible flails are usually of the chain type and may be of several different arrangements on the rotor shaft. The simplest is a single row of flails connected along one side of the shaft. In another form two rows of flails are connected on opposite sides of the shaft with the flails of the two rows either aligned or offset. Three rows of flails may be connected to the shaft at 120° intervals. In another form a single arrangement of flails may be spirally connected along the shaft or connected along the outer edge of an auger on the shaft. In some spreaders four rows of flails are connected to the shaft at 90° to one another.

Most flail type spreaders have front and rear starter flails. These starter flails are impactors pivotally mounted on the outer ends of rotor arms rigidly secured to the shaft.

The dry, wet or sticky manure is usually loaded into the spreader so that it is piled above the rotor shaft. Since the spreader is not operating the flexible chain flails droop downwardly into the tank and the manure piles around the chains and holds them in this position. On rotation of the shaft the chains wrap around the rotor shaft and form an axial passage through the material without discharging the material from the spreader. the front and rear starter flails due to their construction start the discharge of the material.

As the ends of the tank are cleared the chain flails adjacent to the starter flails start to unravel from the shaft and discharge the material from the tank. The material is thus progressively removed from the ends of the tank to the middle.

In liquids, if the tank holds liquids above the rotor level, the resistance of the fluid prevents the chains from throwing any major amount of fluid out of the tank, greatly prolonging the unloading process until the level is lowered and reaches the shaft. The majority of the initial liquid ejected in such a case is thrown by the same starter flails used for the initial ejectment of solids. Once the liquid level reaches no longer above the shaft, the flails become operative and assume an extended position to discharge the liquid or slurry manure along the entire length of the spreader.

To the present time, although flail-type material spreaders have been used for a number of years, pivotable starter flails have not advanced too far and they appear not to be fully satisfying. Known starter flails have a flat segment longitudinally welded perpendicular to the flail to eject material. Placement of the longitudinal flat segment, whether in the middle or at the leading face of the flail, serves to throw material out of the opening of the tank by the brute force of impact of the welded projection.

Furtheron, known flail heads other than the starter flails are formed by simple T-shaped metal flail tips connected on the ends of the chains to assist in the breaking up of solid material and to beat manure out of the tank. In fluid or semi-fluid materials however these flail heads are not very efficient.

SUMMARY OF THE INVENTION

The subject invention is directed to improvements to the starter flails and the flail heads over the prior art teachings which make said starter flails and said flail heads much more efficient, particularly when used for spreading fluid or semi-fluid materials.

According to one aspect of the invention, the aforementioned flat drag segment, while still being attached perpendicularly to the starter flail, is attached in such a way that it is no longer longitudinal to the flail (i.e. not parallel to the length of the flail) but instead thereof is placed at a slant to the parallel axis. Material struck by the flat drag segment cannot as easily slide off tangentially along the flat drag segment and hence "rides" the flat drag segment longer after being picked up by the rotating passage of the starter flail. Thereby more material is flung out of the opening and less material is recycled prematurely back into the tank.

According to another aspect of the invention, a further flat member affixed at the outer surface of the drag segment and parallel to the starter flail, prevents material, caught by the revolving flat segment, to escape therefrom in sideward direction. Further, the added flat member makes the starter flail even more aggressive in attacking material reposing in the tank, helping thereby the starter flail to be even more effective.

According to still a further aspect of the invention, the flail heads comprise cupped surfaces to better pickup and carry fluid and semi-fluid material out of the tank.

Other and further objects and advantages of the invention will be apparent from the following specification and dependent claims taken in connection with the drawings which illustrate preferred embodiments of the invention.

BRIEF DESCRIPTION OF THE DRAWINGS

FIG. 1 is a top view of the tank and rotor shaft with the lid and side omitted.

DETAILED DESCRIPTION OF THE PREFERRED EMBODIMENT

Figure 4:
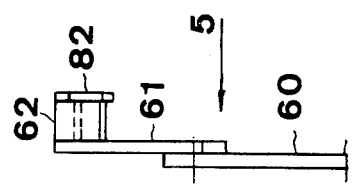
FIG. 4 is a view similar to FIG. 3 but for an alternative embodiment.

The material spreader has a semi-cylindrical tank 11 for holding material and a rotor 12 for discharging the material through the side-opening means 14 between top 16 and tank 11 in the direction indicated by the arrows A. The tank is supported by a frame 18 partially shown in FIG. 2 and wheels 20 rotatably mounted on the axle 22 on opposite sides of the tank. The rotor 12 is driven by the power take-off of the drawing tractor through a drive means (not shown) at the front of the tank.

The material holding tank comprises a semi-cylindrical sheet metal member having side flanges 26 and 28 extending longitudinally along the top edges of the tank. The tank is sealed at the ends by the front tank wall 30 and rear tank wall 32.

Figure 2:
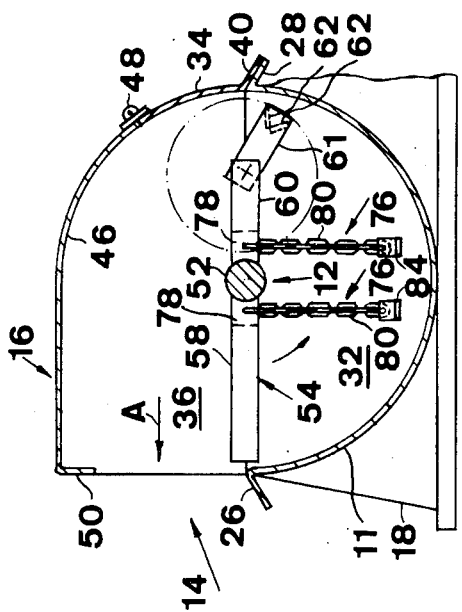
FIG. 2 is a sectional view of the spreader taken along the lines 2—2 of FIG. 1 with the lid and side on the tank.

In FIG. 2 the top 16 is shown in section and comprises a side 34, a rear panel 36 and a matching front panel (not shown). The side 34 is attached by the flange 40 to the side tank flange 28 and to the front and rear panels. These panels are fastened to the front tank flange 42 and the rear tank flang 44, respectively. A lid 46 is hingedly attached to the side 34 by the hinge 48 and extends over the rotor 12 and tank 11. A downward depending flange 50 extends toward the discharge side flange 26 to form the opening means 14.

The rotor 12 comprises a cylindrical shaft 52 which is rotatably mounted in bearings (not shown) attached to the front tank wall 30 and the rear tank wall 32, respectively. The rotor shaft 52 may be in the order of 7 to 12 feet in length, depending upon the length of the material spreader. At the front and rear ends of the rotor, adjacent to the front wall and rear wall, respectively are front and rear starter flails 54 and 56, respectively. The starter flails have rotor arms 58 and 60, respectively rigidly fastened to the rotor shaft 52 extending radially from opposite sides of the shaft.

Figure 10:
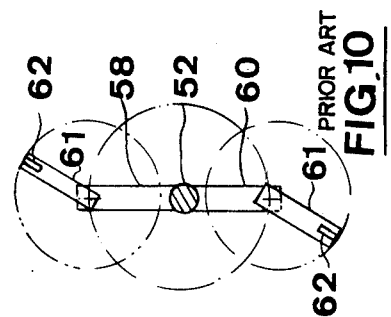
FIG. 10 is a shematic view of a prior art arrangement of the components 3 as shown in FIG. 1.

The rotor arms 58 are substantially longer than the rotor arms 60. At the ends of the rotor arms 60, impactors or hammers 61 are pivotally attached for breaking up material in the spreader and flinging it out of the spreader at the front and rear ends. At the outer tips, the impactors 61 have projections or flat drag segments 62 extending normal thereto for assisting in this action. In known arrangements these flat segments 62 extend longitudinally to the impactors 61 (FIG. 10). In operation, the impactors 61 in cooperation with the flat drag segments 62 break up the material and throw it out through the opening means 14. Thus these flails will start the unloading from the front and rear ends.

The rotor shaft has a plurality of flail assemblies 76. The flail assemblies 76 have connecting tabs or lugs 78 on the shaft 52 and flexible flail chains 80 connected thereto. On rotation of the shaft the flails extend outwardly generally in the dash position as indicated in FIG. 1. The flails will assume these positions when the spreader is operated empty.

Figure 5:
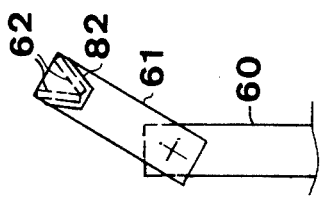
FIG. 5 is a view taken along the arrow 5 in FIG. 4
Figure 9:
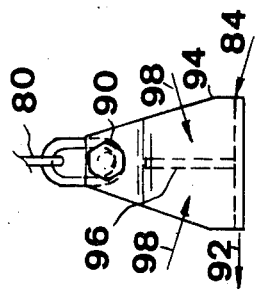
FIG. 9 is a view taken along the arrow 9 in FIG. 8.
Figure 3:
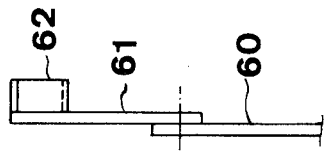
FIG. 3 is a partial side view of the component indicated with reference numeral 3 in FIG. 1
Figure 8:
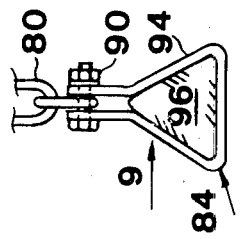
FIG. 8 is a view similar to FIG. 7 but for an alternative arrangement.

With reference to FIGS. 3, 4 and 5 each impactor 61 according to the invention comprises a flat segment 62 which, while still attached perpendicular to the impactor, is attached in such a way that it is no longer longitudinal thereto (i.e. not parallel to the length thereof) but instead thereof is slanted or inclined to the parallel axis. Material struck by the flat segment 62 cannot as easily slide off tangentially along said segment and hence "rides" this flat segment longer after being picked up by the rotating passage of the rotor arm and its associated impactor.

Preferably as the rotor 12 may be rotated in either of two opposite direction to discharge the material either to the right or the left hand side of the machine, the impactors are provided with two flat segments 62 at opposite angles of inclination so that regardless of the direction of rotation one of the flat segments 62 serves as described above in an aggressive manner. (FIG. 4 & 5)

According to another aspect of the invention whether used in combination with only one or two aggressive flat segments 62, a flat member 82 is affixed at the outer surface of the flat segment or segments 62 resulting in a surface parallel to the main pivotable arm or impactor 61 and at the segment's extremity away from the surface attached to said arm or impactor. Preferably this flat segment 82 is of such a size and shape so that its edges project slightly beyond the operative surface, respectively surfaces of the segments 62. Thereby the members 82 make the impactors even more aggressive and efficient in grasping and entrailing material from the tank.

Figure 7:
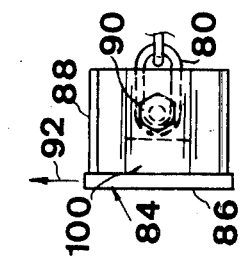
FIG. 7 is a view taken along the arrow 7 in FIG. 6.
Figure 6:
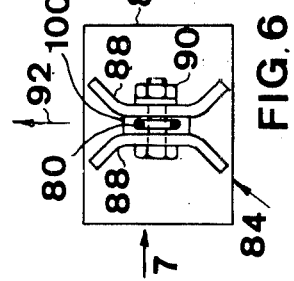
FIG. 6 is a top view of the component shown at 6 in FIG. 1.

With reference to FIG. 6 and 7, the flail head 84 of the flail assemblies 76 will be described in more details. Each flail head comprises a flat surface 86 secured to the extreme end of the associated flexible chain 80 by means of a pair of upstanding legs 88 and a bolt and nut fixation 90. The upstanding legs 88 have a cupped profile to better pick-up and carry material out of the tank. The flail heads 84 are moved in the direction 92 and as will be understood the oblique edges of the upstanding legs 88 shield the bolt and nut fixation 90 to some extend. In order to trap material in said cupped profile a block 100 is secured between the legs 88 and below the fixation point of the flail head 84 to the chain 80. This block 100 also adds some mass to the flail head whereby the same becomes somewhat more aggressive and hence effective.

Operation and Advantages

When in a field with a fully loaded material spreader to start operation, the rotor drive means are coupled to the tractor PTO. Since the material is normally piled above the rotor shaft 52, the chain flails 76 wrap around the rotor shaft 52 upon rotation of said shaft and form an axial passage through the material without discharging the material from the spreader. The front and rear starter flails 54, 56 due to their construction start the discharge of the material. Because of the nature of the pivotable impactors or hammers 61 and the location of their pivot point in relation to their center of gravity, the impactors or hammers 61 partially trail the associated rotating fixed arms 60. The flat segments 62 of the current state of the art as shown in FIG. 10 permit material which they pick-up to easily slide tangentially off the surfaces thereof. The surfaces 62 as shown in FIG. 2 to 5 compensate for most or all of this trailing retardation and slow the tangential "slip" of material enough to eject a greater volume out of the tank opening. Thus in other words material struck by the flat segments 62 according to the invention cannot as easily slide off tangentially along said flat segments and hence rides the flat segments longer after being picked-up by the rotating passage of the impactor. Thus more material flies out of the opening 14 and less is recycled prematurely back into the tank. Thereby, the starting time of the spreading prior to the chain flails becoming fully operative has been shortened considerably.

Further, in case of the double flat segments 62 being affixed to the impactors 61, the additional weight added to the outer ends of said impactors by said second segments supplements the centrifugal forces exerted on the impactors tending thereby to extend said trailing impactors outwardly into a wider arc of travel. This causes the impactors to even still more effectively and faster throw material out of the tank.

When no flat members 82 have been provided, and as was the case in the prior art, while some material slips tangentially off the outer ends of the flat segments 62, so does also some material escape from the side of said flat segments, especially when the latters are not precisely along the leading edge of the respective impactors or when they are slanted in rearward direction in relation to the plane perpendicular to the impactors' main bodies. The flat members 82 affixed to the flat segments 62 and in parallel relationship to the impactors main bodies prevent material from escaping from the flat segments along the side edges and in transverse direction. Material is thus trapped from escaping along the sides of the flat segments 62 and thus is directed toward the tank opening for more efficient ejectment. Further the added flat members 82 make the impactors even more aggressive in attacking material reposing in the tank, because of the increased weight at the extreme ends of said impactors and because of the cupped shape of the segments 62 together with the members 82.

Furtheron, in the event solid or semi-solid manure is to be spread, and as the ends of the tank become cleared by the operation of the starter flails 54–56, the chain flail assemblies 76 adjacent to the starter flails 54–56 start to unravel from the shaft and discharge the material from the tank. The material is thus progressively removed from the ends of the tank to the middle. In liquid or slurry-type manures all the chain flail assemblies 76 become operative to spread the material over the field from the moment the level of material in the tank reaches about the level of the rotor shaft 52. The cupped profile of the chain flail heads 84 as realized by the particularly shaped upstanding legs 88 better pick-up and carry the material out of the tank. At the same time the cupped profile acts more or less as a protective shielding for the bolts and nuts 90 whereby the wear of the screw thread on the nuts is slowed down. In general the improved starter flails will provide an easier and faster staring, a more even spreading and require less horsepower, while the improved chain flail heads will equally secure a more even spreading.

The foregoing advantages of the more aggressive components are particularly apparent when fluid or semi-fluid material is to be spread.

Modifications

While this invention has been described in connection with a single embodiment thereof, it will be understood that it is capable of modifications and this application is intended to cover any variations, uses or adaptations following in general the principles of the invention and including such departures from the disclosure as come within known or customary practice in the art to which the invention pertains and as fall within the scope of the invention or the limits of the appended claims.

As an example, the flat segments 62 forming a V extending perpendicular to the main body of the impactor or hammer 61, with the point of the V toward the pivot point of the latter, and combined with the flat member 82, may all together be replaced by angles with the turned edges turned away from each other and extending parallel to the main body to form a pair of cupped surfaces. The other edges of said angles are welded to the main body in a V with the point of the V facing said pivot point.

In still another embodiment, the chain flail heads 84 may be formed by a piece of sheet metal 94 bent in a generally triangular shape when seen in the direction of movement 92 and having welded or otherwise affixed at the inner side thereto a flat member 96 so as to form cupped profiles 98.

Having thus described my invention, what I claim is:
1. In a flail-type material spreader having:
    a material holding tank with end surfaces and a discharge opening for material to be unloaded therethrough;
    a rotor shaft within said tank longitudinally to said opening;
    a plurality of flails secured at one end to said rotor shaft to unload material within said tank through said opening upon rotation of said shaft; and
    at least one starter flail mounted to said rotor shaft for starting the unloading process, the starter flail comprising:
        an arm mounted at one of its ends to said rotor shaft and extending radially outwardly therefrom;
        an elongated main body having one end pivotally attached to the other end of said arm adjacent a side thereof; and
        a drag segment affixed only to the side of said main body opposite the side attached to said arm, said drag segment is inclined upwardly and rearwardly to the elongated axis of said main body for attacking material reposing in said tank and ejecting said material out of said tank.
2. A flail-type material spreader as set forth in claim 1 wherein the starter flail is provided adjacent to an end surface of the tank and having the drag segment affixed to the main body at the surface thereof opposite to said end surface; the starter flail being rotatable edgewise.
3. A flail-type material spreader as set forth in claim 2 wherein at least one starter flail is provided adjacent to each end surface of the tank.
4. A flail-type material spreader as set forth in claim 1 wherein the drag segment is affixed to the main body at the end thereof opposite to the pivot axis.
5. A flail-type material spreader as set forth in claim 1 wherein said drag segment is a flat surface and extends perpendicularly outwardly from said side of said main body.
6. In a flail-type material spreader having:
    a material holding tank with end surfaces and a discharge opening for material to be unloaded therethrough;

a rotor shaft within said tank longitudinally to said opening;

a plurality of flails secured at one end to said rotor shaft to unload material within said tank through said opening upon rotation of said shaft; and at least one starter flail mounted to said rotor shaft for starting the unloading process, the starter flail comprising:

an elongated main body, a drag segment affixed to said main body and slanted to the elongated axis thereof and a flat member affixed to the edge of the drag segment opposite to said main body and extending parallel thereto, the flat member having a forward edge projecting beyond the front surface of the drag segment forming therewith a cupped profile for attacking material reposing in said tank and ejecting said material out of said tank.

7. In a flail-type material spreader having:

a material holding tank with end surfaces and a discharge opening for material to be unloaded therethrough, a rotor shaft within said tank longitudinally to said opening, a pluraity of flails secured at one end to said rotor shaft to unload material through said discharge opening upon rotation of said rotor shaft, and at least one starter flail for starting the unloading process, the starter flail comprising:

an arm mounted at one of its ends to said rotor shaft and extending radially outwardly therefrom;

an elongated main body having one end pivotally attached to the other end of said arm adjacent a side thereof; and a pair of drag segments affixed only to the side of said main body opposite the side attached to said arm, said drag segments extend perpendicularly outwardly from said side and are oppositely inclined relative to the longitudinal axis of the main body in the form of a V with the point of the V toward the pivot axis of said main body.

8. A flail-type material spreader as set forth in claim 7 further comprising a flat member affixed to the edges of the drag segments opposite to the main body and extending parallel thereto; the flat member having edges projecting beyond the outer surfaces of the drag segments forming therewith cupped profiles.

9. In a flail-type material spreader having:

a material holding tank with end surfaces and a discharge opening for material to be unloaded therethrough, a rotor shaft within said tank longitudinally to said discharge opening, a plurality of flails secured at one end to said rotor shaft to unload material through said discharge opening upon rotation of said rotor shaft, and at least one starter flail for starting the unloading process, the starter flail comprising:

an elongated main body pivoted at one end to the rotor shaft, and a pair of drag segments affixed to the main body at opposite angles of inclination in relation to the longitudinal axis of the main body, said drag segments are angles with the turned edges turned away from each other and the other edges being affixed to the main body to form with said body a pair of cupped profiles.

10. In a flail-type material spreader having:

a material holding tank with end surfaces and a discharge opening for material to be unloaded therethrough, a rotor shaft within said tank longitudinally to said opening, a plurality of flail assemblies secured to said rotor shaft for upon rotation of said shaft to unload material through the opening; each flail assembly comprising:

a flexible flail chain secured at one end to the rotor shaft and a flail chain head secured to the other end of the flail chain, the flail chain head being rotatable by the rotor shaft and having a cupped surface in the direction of rotation to pickup-up material reposing in the tank and ejecting it through the opening, said flail chain head comprises a lower flat surface and a pair of adjacent upstanding legs affixed to said lower flat surfaces and having bent front and rear sections projecting outwardly and away from each other for defining said cupped surfaces.

11. A flail-type material spreader as set forth in claim 10 wherein each upstanding leg has an aperture for receiving fixation means therethrough for the fixation of the flail chain head to the free end of the associated flail chain.

12. A flail-type material spreader as set forth in claim 11 wherein the flail chain head further comprises a block means affixed to the lower flat surface and to the sides of the upstanding legs facing toward each other and at a location below the fixation of the flail chain head to the associated flail chain for preventing material picked-up by said flail chain head to escape between said upstanding legs.

13. In a flail-type material spreader having:

a material holding tank with end surfaces and a discharge opening for material to be unloaded therethrough, a rotor shaft within said tank longitudinally to said opening, a plurality of flail assemblies secured to said rotor shaft for upon rotation of said shaft to unload material through the opening; each flail assembly comprising:

a flexible flail chain secured at one end to the rotor shaft and a flail chain head secured to the other end of the flail chain, the flail chain head being rotatable by the rotor shaft and having a cupped surface in the direction of rotation for picking up material reposing in the tank and ejecting it through the opening, said flail chain head comprises a piece of sheet metal bent in a generally triangular shape when seen in the direction of rotation and a triangularly shaped flat member affixed thereto at the inner side thereof to form therewith said cupped surfaces.

* * * * *

UNITED STATES PATENT OFFICE
CERTIFICATE OF CORRECTION

Patent No. 3,980,239   Dated September 14, 1976

Inventor(s) John L. Lee

It is certified that error appears in the above-identified patent and that said Letters Patent are hereby corrected as shown below:

On the cover sheet insert:

-- [73] Assignee: Sperry Rand Corporation,

New Holland, Pa. --.

Signed and Sealed this

Twenty-eighth Day of December 1976

[SEAL]

Attest:

RUTH C. MASON
*Attesting Officer*

C. MARSHALL DANN
*Commissioner of Patents and Trademarks*